Nov. 16, 1926.
H. O. HEM
WEIGHING SCALE
Filed Sept. 10, 1923
1,606,939
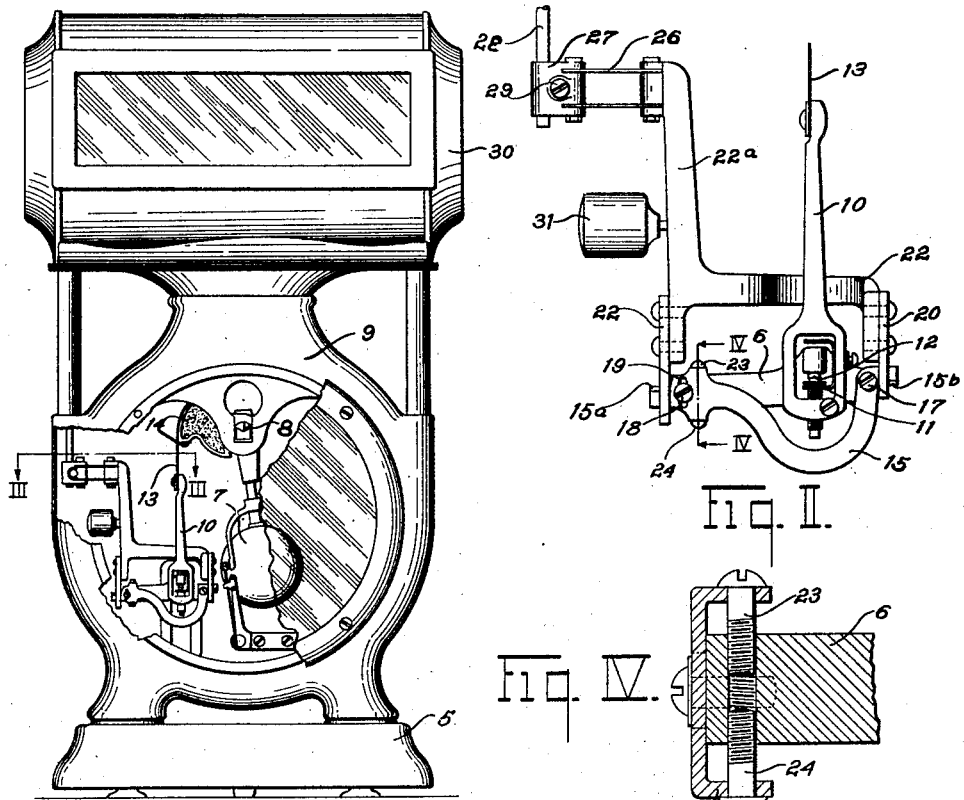
Inventor
HALVOR O. HEM.
By Ed. M. Marshall
Attorney Patented Nov. 16, 1926.

1,606,939

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 10, 1923. Serial No. 661,830.

This invention relates to weighing scales and particularly to the indicating mechanism thereof. Certain types of modern weighing scales employ a rotating indicating member, such as a cylinder, dial, or pointer, driven from a moving portion of the weight counter-balancing mechanism thru a rack and pinion. An example of this type is shown in the Hapgood Patent, #1,142,165, issued June 8th, 1915. This invention aims to improve upon the present means of connection between the weight-counterbalancing mechanism and the indicator.

Among the objects of my invention are the provision of a rack rod mounted upon the scale beam on opposite sides of the beam; the arrangement of knife edge supports for the rack rod with adjustments for aligning the connection with the rack and the connection with the weight offsetting member in the same horizontal plane; the interposition of resilient shock absorbing members between the rack and its connection with the scale beam, and the arrangement of the rack adjacent one side of the scale while enabling the same graceful sloping of both sides of the scale housing.

The above and other objects of my invention will be apparent from the following description wherein reference is had to the accompanying drawings illustrating a preferred embodiment of my invention and wherein similar reference numerals designate similar parts throughout the several views.

In the drawing:—

Fig. 1 is a rear elevation of the weighing scale equipped with my improved indicating mechanism, parts being broken away to show the interior construction.

Fig. 2 is an enlarged detail view of the connection between the scale beam and rack.

Fig. 3 is a detail sectional view taken substantially on the line 3—3 of Fig. 1.

Fig. 4 is a detail sectional view taken substantially on the line 4—4 of Fig. 2, and Fig. 5 is a detail elevation of one of the bearing plates carried by the rack foot.

I have illustrated my invention in connection with a platform scale with a rotating computing cylinder indicator, though it will be apparent that the invention is also capable of use in connection with any scale having a rotating indicating member.

In the illustrated embodiment the numeral 5 designates the base of the scale on which is pivoted through suitable standards the scale beam 6, which is preferably a lever of the 2nd order with one extremity connected with the weight offsetting member, herein shown as a pendulum 7 pivoted, as at 8, on jewel bearings carried by the housing 9 of the scale. A suitable stirrup 10 carries an adjustable bearing 11 adapted to receive the cone-shaped pivot 12 on the free extremity of the scale beam (see Fig. 2). A flexible band 13 is secured to the upper end of the stirrup and passes over the periphery of a segment 14 carried by the pendulum 7. With this construction the scale beam is directly connected to swing the pendulum 7 through an arc proportionate to the displacement of the free end of the scale beam by the weight of a commodity placed upon the scale pan.

The mechanism thus far described is in accord with present day construction as shown for example in the above-mentioned patent to Hapgood.

My improved indicating mechanism includes a rack-foot supporting bar 15 adjustably mounted upon the forked extremities 16 of the scale beam and carrying oppositely extending knife-edge pivots $15^a$ and $15^b$ respectively. The forked extremities 16 extend on opposite sides of the connection of the scale beam with the stirrup 10 and the knife-edge pivots $15^a$ and $15^b$ are arranged in the same vertical as well as the same horizontal plane as the pivot 12 on the scale beam where it seats in the bearing 11 carried by the stirrup. The bearing 11 is adjustable vertically, as shown in Fig. 2, while the knife-edge pivots $15^a$ and $15^b$ are adjustable both vertically and horizontally through the following construction.

A pair of bolts 17 and 18 are threaded through the supporting bar 15 into the forked extremities of the scale beam, and while it is preferable that the forked extremities be machined so as to enable the pivots $15^a$ and $15^b$ to lie in the same vertical plane with the pivot 12 of the scale beam when the supporting bar 15 is in contact with the forked extremities 16, adjustment can be made by interpositioning washers between the forked extremities 16 and the supporting bar 15. Horizontal adjustments of the rack are taken care of by permitting the oscillation of the supporting bar 15 on one of the bolts, as 17, an elongated slot 19 being arranged in the supporting bar 15 adjacent the opposite bolt 18. By loosening the bolts 17 and 18 and swinging the supporting bar 15 through the desired arc the rack can be swung laterally to bring it into proper arrangement with the chart pinion (not shown). The bolts 17 and 18 are then tightened to maintain this position. Further protection for maintaining the desired adjustment is provided by a pair of oppositely disposed screws 23 and 24 threaded into the upper and lower faces of the scale beam 6 and passing through ears 25 on the supporting bar 15 (note Fig. 4). The rack foot preferably comprises a pair of bearing plates 20 and 21, having oppositely extended V-shaped bearings for cooperation with the knife edge pivots 15ª and 15ᵇ and the bearing plates are secured firmly upon a casting 22 shaped to clear the stirrup 10 while maintaining the bearing plates with their V-bearings in vertical alignment with the pivot 12 of the scale beam. The casting 22 has an upwardly extending arm 22ª which carries at its upper extremity a slotted portion for the reception of a pair of resilient shock absorbing members 26 arranged between the casting and a slotted member 27 carried by the rack-rod 28. The member 27 is also slotted in a vertical direction to clamp the rack-rod 28, a screw 29 being provided to firmly secure the base of the rack-rod in position. The upper extremity of the rack rod 28 carries a rack (not shown) adapted to mesh with a pinion fixed on the horizontal shaft of the rotating cylinder enclosed within the casing 30. A weight 31 is fixed on the rack-foot 22 in a plane forward of the plane of the pivots 15ª and 15ᵇ to pull the rack into permanent mesh with the pinion. No improvement is intended in the rack and pinion per se, and accordingly these members are not illustrated.

The operation of my improved connection for the indicating mechanism is believed to be obvious. Whenever a commodity to be weighed is placed upon the scale pan, the free extremity of the scale beam 6 is depressed and through its connection with the stirrup 10 swings the pendulum 7 through an arc sufficient to counter-balance the weight of the commodity. Simultaneously the movement of the scale beam lowers the rack-foot 22 through the supporting bar 15, causing the lowering of the rack-rod 28 a sufficient distance to rotate the indicating cylinder to show the weight of the commodity.

The rack-foot 22 swings on the pivots 15ª and 15ᵇ as the end of the scale beam 6 moves through its arc, though the pivots 15ª and 15ᵇ can be made to traverse almost a straight line by positioning the scale beam normally slightly above a horizontal plane. The shock absorbing members 26 absorb any shocks and jars caused by the sudden placing or dropping of heavy commodities upon the scale pan, and prevent their reaching the rack and pinion.

While it will be apparent that the illustrated embodiments of my invention herein disclosed are well calculated to adequately fulfill the object and advantages primarily stated, it is to be understood that the invention is susptible to variation, modification and change within the spirit and scope of the subjoined claims.

Having described my invention, I claim—

1. In a weighing scale, in combination, a base, an upright symmetrical housing thereon, said housing being narrowed at its lower end, a lever extending into the narrowed lower end of said housing, a rack extending upwardly in the wider part of said housing, and an offset rack foot connecting said rack and lever to transmit vertical movement of said lever to said rack.

2. In a weighing scale, in combination, a base, an upright symmetrical housing thereon, said housing being narrowed at its lower end, a lever extending into the narrow part of said housing and having knife edge pivots on opposite sides of its longitudinal axis, a rack extending upwardly adjacent one of the sides of the wider part of said housing, and an offset rack foot connecting said rack to said lever to transmit vertical movement of said lever to said rack.

3. In a weighing scale having a beam and a rotary indicator, means for rotating the indicator from the beam including a rack rod, a supporting bar mounted upon the beam and carrying knife-edge pivots, and a rack foot resting upon said pivots and connected with the rack rod, said supporting bar being adjustable vertically and longitudinally of said beam.

4. In a weighing scale having a beam and a rotary indicator, means for rotating the indicator from the beam including a rack rod, a supporting bar mounted upon the beam and carrying knife-edge pivots extending on both sides of the longitudinal axis of the beam, and a rack foot resting upon said pivots and connected with the rack rod, said supporting bar being adjustable vertically and longitudinally of said beam.

5. In a weighing scale having a beam and a rotary indicator, means for rotating the indicator from the beam including a rack rod, a supporting bar mounted upon the beam and carrying knife-edge pivots, a rack foot resting upon said pivots, and a resilient connection between the rack foot and rack rod, said supporting bar being adjustable vertically and longitudinally of said beam.

6. In a weighing scale having a beam and a rotary indicator, means for rotating the indicator from the beam including a rack rod, a supporting bar mounted upon the beam and carrying knife-edge pivots, a rack foot resting upon said pivots, and spaced resilient members connecting the rack foot to the rack rod, said supporting bar being adjustable vertically and longitudinally of said beam.

7. In a weighing scale having a beam and a rotary indicator, means for rotating the indicator from the beam including a rack rod, a rack foot resiliently connected thereto, and a supporting bar for the rack foot pivotally mounted upon the beam for adjustment in a vertical plane.

8. In a weighing scale having a beam and a rotary indicator, means for rotating the indicator from the beam including a rack rod, a rack foot resiliently connected thereto, a supporting bar for the rack foot pivotally mounted upon the beam for adjustment in a vertical plane, and oppositely-disposed set screws engaging the bar and beam for securing the bar in any adjusted position.

9. In a weighing scale having a beam and a rotary indicator, means for rotating the indicator from the beam including a rack rod, a rack foot resiliently connected thereto, a supporting bar for the rack foot pivotally mounted upon the beam for adjustment in a vertical plane, said bar carrying oppositely-disposed knife-edge pivots at its extremities, and bearing plates on the rack foot arranged to engage the knives of said pivots.

10. In a weighing scale having a beam and a rotary indicator, weight-offsetting mechanism, connections for actuating said mechanism from the beam including a nose iron pivot on the beam, and means for rotating the indicator from the beam including a rack rod and a support therefor pivotally mounted upon the beam in the same vertical plane with and on opposite sides of the point of the nose iron pivot.

11. In a weighing scale having a beam and a rotary indicator, weight-offsetting mechanism, connections for actuating said mechanism from the beam including a nose iron pivot on the beam, and means for rotating the indicator from the beam including a rack rod and a support therefor pivotally mounted upon the beam in the same vertical and horizontal plane with and on opposite sides of the point of the nose iron pivot.

12. In a weighing scale having a beam and a rotary indicator, weight-offsetting mechanism, connections for actuating said mechanism from the beam including a nose iron pivot on the beam, and means for rotating the indicator from the beam including a rack rod, a rack foot connected thereto, and a supporting bar pivotally mounted upon the beam and engaging the rack foot, the supporting bar carrying knife-edge pivots adapted to align vertically and horizontally with the point of the nose iron pivot.

13. In a weighing scale having a beam and a rotary indicator, weight-offsetting mechanism, connections for actuating said mechanism from the beam including a nose iron pivot on the beam, and means for rotating the indicator from the beam including a rack rod, a rack foot connected thereto, and a supporting bar pivotally mounted upon the beam and engaging the rack foot, the supporting bar carrying knife-edge pivots adapted to align vertically and horizontally with the point of the nose iron pivot, and means for locking the supporting bar to the beam in any adjusted position.

14. In a weighing scale having a rack rod and a weight-offsetting member, a beam having a three-tined extremity, the central tine carrying a pivot for connection with the weight-offsetting member and the end tines carrying a supporting bar having pivots for connection with the rack rod.

15. In a weighing scale having a rack rod and a weight-offsetting member, a beam having a three-tined extremity, the central tine carrying a pivot for connection with the weight-offsetting member and the end tines adjustably supporting a bar carrying oppositely-disposed pivots for connection with the rack rod.

16. In a weighing scale, in combination, a lever, a rotary indicator, a rack rod for operating said indicator, a rack foot for connecting said rack rod to said lever, the point of connection of said rack foot to said rack rod being some distance above and at one side of the place of the connection of said rack foot to said lever.

HALVOR O. HEM.